G. TEFFT.
Car Wheel.

Patented May 7, 1867.

Witnesses:
Charles D. Kellum
R. H. Reille

Inventor:
George Tefft

G. TEFFT.
Car Wheel.

No. 64,595.

Patented May 7, 1867.

Witnesses:
Charles D Kellum
R H Riell

Inventor:
George Tefft

United States Patent Office.

GEORGE TEFFT, OF SALEM, NEW YORK

Letters Patent No. 64,595, dated May 7, 1867.

---

IMPROVEMENT IN LOCOMOTIVE AND OTHER WHEELS.

---

*The Schedule referred to in these Letters Patent and making part of the same.*

---

TO ALL WHOM IT MAY CONCERN:

Be it known that I, GEORGE TEFFT, of Salem, in the county of Washington, and State of New York, have invented an "Improvement in Drive-Wheels of Locomotive Engines and other Wheels;" and I do hereby declare that the following is a full, clear, and exact description of the same, reference being hereby had to the accompanying drawings, which form and make a part of this specification.

Like letters represent and refer to like or corresponding parts.

Figure 3:
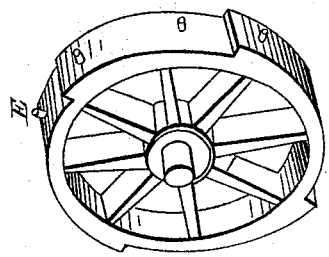
Figure 2:
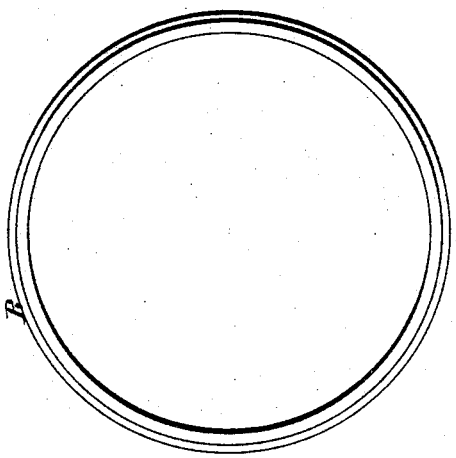
Figure 2 is a face view of the tire B, which surrounds the outer rim of the wheel A, in the manner and for the purposes substantially as hereinafter fully described and set forth.
Figure 1:
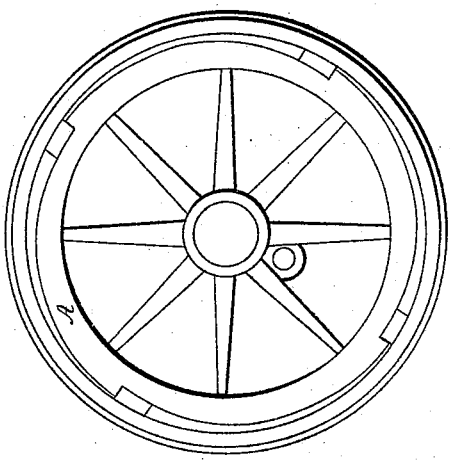
Figure 1 is a face view of a locomotive drive-wheel, constructed in accordance with my said invention, and showing the various parts thereof, each more fully hereinafter described and set forth.

Figure 3 is a perspective view of the wheel A, with the tire B, wedges C, and keys D removed therefrom, and showing the pins or projections E, which are for the purpose of holding the wedges C in their proper position on the periphery of the wheel for the purpose of securely fastening the said tire B to the wheel A, substantially in the manner and for the purposes hereinafter fully described and set forth.

Figure 4:
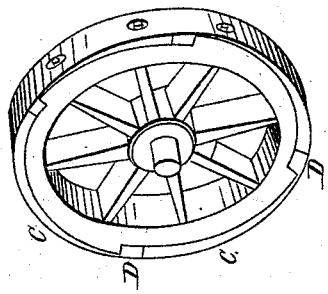

Figure 4 is a perspective view of the wheel A, showing the wedges C and keys D combined therewith, in the manner and for the purposes fully hereinafter described and set forth.

Figure 5:
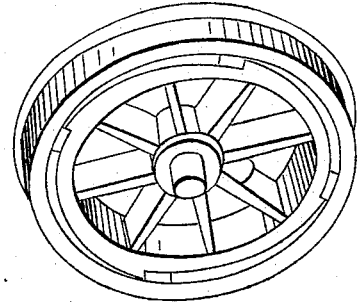

Figure 5 is also a perspective of a locomotive engine or other wheel, constructed in accordance with my said invention, and showing the various parts thereof combined together so as to form a perfect wheel, the construction of each part, and the combining of them together, being fully hereinafter described and set forth.

Figure 6:
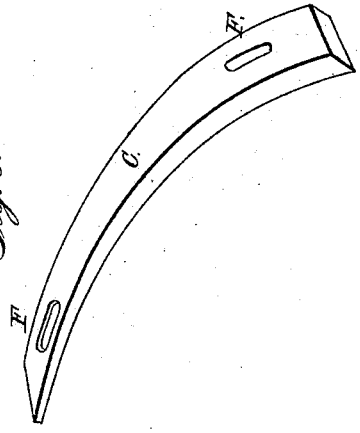

Figure 6 is a perspective view of one of the wedges C, showing the slots or recesses F in the same, into which the pins or projections E fit, thereby holding the said wedges C in their proper position on the periphery of the wheel A, in the manner substantially as seen at fig. 4, and more fully hereinafter described and set forth.

Figure 7:
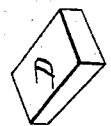

Figure 7 is a view of one of the keys D which are driven in between the wedges C for the purpose of securely fastening and combining together the wheel A, wedges C, and tire B, substantially in the manner and for the purposes herein described.

The nature of my said invention and improvements consists in the employment of the wedges C C C C and keys D D D D for the purpose of securely fastening or setting the tire B on the said wheel A, in the manner substantially as hereinafter fully described and set forth.

To enable others skilled in the art to which my invention relates to make and use the same, I will here proceed to describe the construction and operation thereof, which is as follows, to wit:

The body or main part of the wheel A is cast in the shape or manner shown at fig. 3, and the projections or pins E are cast upon the same. The said wedges C are then placed upon the periphery of the wheel, the pins E projecting through the slots or recesses F, and holding the same in their proper place. The steel or other tire designed to be fastened upon the said wheel A is then placed around the same. Between each wedge C is left a recess or open space, into which the keys D are driven for the purpose of setting the tire. As the said keys D are driven in between the said wedges C the same are forced forward, and, acting like a wedge, securely fasten and set the said tire B to and on the said wheel A, sufficient room being allowed for the said wedges to be forced forward far enough to securely fasten the said tire B to the wheel A, as aforesaid. The keys D may be of any size and shape deemed best so as to securely set the tire B upon the wheel A.

My invention is chiefly designed to be applied to locomotive-engine and other metallic wheels, but it can be applied to any wheel on which it may be desired to set a tire. According to the present method of setting steel or other metallic tires upon metal wheels the tires become loose, and are obliged to be reset several times before the tire is worn out, which can be done only at great expense and loss of time, but by my method, and in accordance with my invention, should the tire become loose from wear or other causes, the same can be readily reset or tightened, without trouble or expense, by simply removing the keys D and inserting in their stead larger ones, thereby making the tire as firm and solid as when first set upon the said wheel A.

Having thus described the nature of my said invention and improvements, what I claim as my invention, and desire to secure by Letters Patent of the United States, is—

The employment of the wedges C C C C, in combination with the keys D D D D, or their equivalents, operating in the manner and for the purposes substantially as herein fully described and set forth.

In testimony whereof I have hereunto set my hand this 24th day of August, A. D. 1866.

GEORGE TEFFT.

Witnesses:
CHARLES D. KELLUM,
E. CARVER.